(12) United States Patent
Graef et al.

(10) Patent No.: US 11,592,350 B2
(45) Date of Patent: Feb. 28, 2023

(54) BALANCE GUIDE FOR A TUBULAR ELEMENT

(71) Applicant: PSE COMPOSITES LIMITED, Ballinspittle (IE)

(72) Inventors: Edmund Graef, Ballinspittle (IE); Peter Graef, Ballinspittle (IE)

(73) Assignee: PSE COMPOSITES LIMITED, Ballinspittle (IE)

( * ) Notice: Subject to any disclaimer, the term of this patent is extended or adjusted under 35 U.S.C. 154(b) by 171 days.

(21) Appl. No.: 17/161,353

(22) Filed: Jan. 28, 2021

(65) Prior Publication Data
US 2021/0247260 A1    Aug. 12, 2021

(30) Foreign Application Priority Data

Feb. 10, 2020    (EP) .................................... 20156472

(51) Int. Cl.
*G01M 1/12* (2006.01)
*F41A 31/00* (2006.01)

(52) U.S. Cl.
CPC .............. *G01M 1/12* (2013.01); *F41A 31/00* (2013.01)

(58) Field of Classification Search
None
See application file for complete search history.

(56) References Cited

U.S. PATENT DOCUMENTS

| 1,825,172 | A | * | 9/1931 | Barret | G01M 1/00 73/65.03 |
| 5,814,773 | A | * | 9/1998 | Latiri | A63B 60/02 177/171 |
| 2004/0139793 | A1 | * | 7/2004 | Bac | A63B 60/42 73/65.01 |
| 2018/0345105 | A1 | * | 12/2018 | Latiri | G01G 19/52 |

FOREIGN PATENT DOCUMENTS

| CN | 208751789 U | 4/2019 |
| JP | 2019066271 A | 4/2019 |

* cited by examiner

*Primary Examiner* — Paul M. West
*Assistant Examiner* — Mark A Shabman
(74) *Attorney, Agent, or Firm* — Studebaker & Brackett PC (57) ABSTRACT

A test apparatus determines the state of torsional balance of an elongate device about its longitudinal axis. It has a base plate, supporting two sets of longitudinally spaced-apart low-friction roller bearings. The second bearings are mounted on the base at a higher location than the first bearings. A support for the second bearings has a side opening to allow lateral movement of the device under test into engagement with the underside of the second bearings which resting on the upper side of the first bearings. The device under test may be a rifle or a golf putter, the barrel or shaft respectively of which is supported on the roller bearings of the first set and in contact with the underside of the second bearings. The device will rotate about the longitudinal axis if not balanced about the axis. It is very easy and (Continued)

convenient for the user to place the tube in the guide to check for balance whenever checking balance of the item. The side opening allows use with a variety of devices having irregular shapes along its length.

18 Claims, 8 Drawing Sheets

BALANCE GUIDE FOR A TUBULAR ELEMENT

INTRODUCTION

Field of the Invention

The invention relates to monitoring balance about the longitudinal axis in an elongate device such as a rifle barrel or a golf putter or a bar of any type, tubular or solid.

Prior Art Discussion

US2004/139793 (BAC) describes a digital swing weight scale. CN208751789 (Yang) describes a support device for a fan impeller balancing machine. JP2019066271 (Yamagami) describes an unbalance testing machine.

The present invention is directed towards achieving convenient and accurate detection of torsional imbalance of a device about its longitudinal axis, thereby allowing a user to modify the tested device to achieve the required balance about the longitudinal axis.

SUMMARY

We describe an apparatus to determine state of torsional balance of a tested device about its longitudinal axis, the apparatus comprising:
a base,
a first bearing set preferably having at least two bearings,
a first support mounting the first bearing set to the base,
a second bearing set preferably having at least two bearings,
a second support mounting the second bearing set to the base,
wherein:
the first and second supports support the first and second bearing sets at locations which are spaced apart in a longitudinal direction, and
the second support supports the second bearing set at a higher level relative to the base than the first bearing set, so that a tested device can overlie the first bearing set and underlie the second bearing set while being supported solely by the first and second bearing sets.

Preferably, the second support has a side opening on one lateral side to allow side access by a tested device.

In one example, at least one of the bearing sets comprises two roller bearings forming a cradle for a device.

In one example, at least one of the bearing sets comprises two roller bearings forming a cradle for a device, and wherein the bearings are spaced-apart longitudinally and overlap laterally.

In one example, the bearings of at least one bearing set have device-engaging surfaces which are curved in the longitudinal direction in a convex manner.

In one example, the bearings of at least one bearing set comprise a polymer with a device-engaging surface.

In one example, one or both of the first and second supports is mountable to the base at any of a plurality of positions in the longitudinal direction.

In one example, one or both of the first and second supports is mountable to the base at any of a plurality of positions in the longitudinal direction, and wherein the base comprises a plurality of engagement features for engagement with a support.

In one example, one or both of the first and second supports is mountable to the base at any of a plurality of positions in the longitudinal direction, and wherein the base comprises a plurality of engagement features for engagement with a support, and wherein said engagement features include apertures and pins.

In one example, one or both of the first and second supports is mountable to the base at any of a plurality of positions in the longitudinal direction, and wherein the base comprises a plurality of engagement features for engagement with a support, and wherein the base comprises a plate having a planar top surface.

In one example, at least one bearing support is adjustable to adjust level of its bearing set above the base.

In one example, at least one bearing support is adjustable to adjust level of its bearing set above the base, and wherein said bearing support comprises an adjustable plate mounted on a fixed plate.

In one example, at least one bearing support is adjustable to adjust level of its bearing set above the base, and wherein said bearing support comprises an adjustable plate mounted on a fixed plate, and wherein said support comprises a fastener extending through a slot on one of the fixed and movable plates.

In one example, at least one bearing support is adjustable to adjust level of its bearing set above the base, and wherein said bearing support comprises an adjustable plate mounted on a fixed plate, and wherein said support comprises a fastener extending through a slot on one of the fixed and movable plates, and wherein said fastener is hand-operated or tool-operated.

In one example, the second support comprises an arm which extends away from the base, and a lateral arm which extends laterally over the base and to which the roller bearings are mounted, said lateral arm forming the side opening.

In one example, the second support is fixed to the base and the second bearing set is not adjustable.

In one example, the base includes a clamp for attachment to a table. In one example, longitudinal distance between the first and second bearing sets is in the range of 70 mm and 200 mm. In one example, diameter of each bearing is in the range 10 mm and 70 mm.

We also describe a method of detecting, using the apparatus of any example, imbalance about a longitudinal axis of an elongate device under test, said device having a circular cross-sectional shape in least two longitudinally spaced-apart first and second portions, the method comprising the steps in any order of:
placing the first portion on the first bearing set,
moving the device laterally so that the second portion enters via the second support side opening and engages the underside of the second roller bearing set and the device is fully supported by the bearings, and
checking if there is rotation of the tube, and if there is rotation determining the tube radial side which is facing downwardly.

In one example, the device is a rifle and the first and second portions are on a barrel of the rifle.

In another example, the device is a golf club and the first and second portions are on the shaft of the golf club.

In one example, the first bearing set is proximally of the second bearing set, and the device under test is mounted to the apparatus with its centre of gravity proximal of the first bearing set.

We describe apparatus' for detecting the state of balance about the longitudinal axis of an elongate device, alternatively referred to as a "balance guide" or "tool" in this specification. In at least some examples the apparatus comprises:
a base,
a first bearing set mounted on the base, and
a second bearing set mounted on the base,
the second bearing set being at a higher level relative to the base than the first bearing set.

Accordingly, a tube can overlie the first bearing set and underlie the second bearing set whereby the tube can be supported on the roller bearings of the first set and be in contact with the bearings of the second set and rotate about its axis if not balanced about said axis.

Preferably, the first and second roller bearing sets are mounted to be spaced apart in the longitudinal direction. Preferably, at least one of the sets comprises two roller bearings arranged so that a tube can be cradled on said bearings.

Preferably, one or both of the sets is mountable to the base at a desired location to adjust relative longitudinal spacing of the first and second sets. Preferably, position relative to the longitudinal axis of at least one set is adjustable.

Preferably, at least one set is mounted on an adjustable plate which is mounted on a fixed plate.

Preferably, said set comprises a hand-operated fastener extending through a slot on one of the fixed and movable plates. Preferably, at least one set comprises a support which comprises an arm which extends away from the base, and an arm which extends laterally over the base and to which the roller bearings are mounted. This allows convenient access by a tube to the space under the bearing set.

Preferably, the base includes a clamp for attachment to a table. The clamp is preferably adjustable.

In one example, the bearings of each set are spaced-apart longitudinally and overlap laterally. In other examples they are at the same longitudinal position and do not overlap laterally.

We also describe a method of detecting, using the guide of any example, imbalance about a longitudinal axis of an item having a tube, the method comprising placing the tube on the first roller bearing set and the tube also engaging the underside of the second roller bearing set, checking if there is rotation of the tube, and if there is rotation determining the tube radial side which is facing downwardly.

Preferably, the tube is placed at a longitudinal position at which the item is horizontal and fully supported by the guide.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

In various embodiments we describe an apparatus to determine or test the state of torsional balance of an elongate device about its longitudinal axis. In two examples the tested device is a rifle or a golf putter.

Referring to FIGS. 1 to 18 a test apparatus 1 is illustrated, suited to detect balance of a tubular element about its longitudinal axis. The apparatus 1 comprises a base plate 2 of rectangular shape in plan, and of steel material. In other examples the base may be of a different configuration and may be of a different metal or indeed a polymer. The plate is arranged to be mounted to a bench by a clamp 3. The claim 3 comprises a member 3(*a*) which extends laterally and bends downwardly vertically as a spindle, and a plate 3(*b*) carried on a nut 3(*c*) which forms a lower together with the base 2 being an upper jaw for clamping to a table edge. In other examples there is no table clamp, and the base is affixed directly to a fixed support, for example by being fastened by screws. The base plate 2 supports a first tube support 5 and a spaced apart second tube support 6. The term "tube" is intended to mean any elongate round element, both tubular and solid bar. It is not essential that a device being tested is fully tubular, just that it has at least two locations longitudinally spaced apart which are circular in cross-section.

Figure 10:
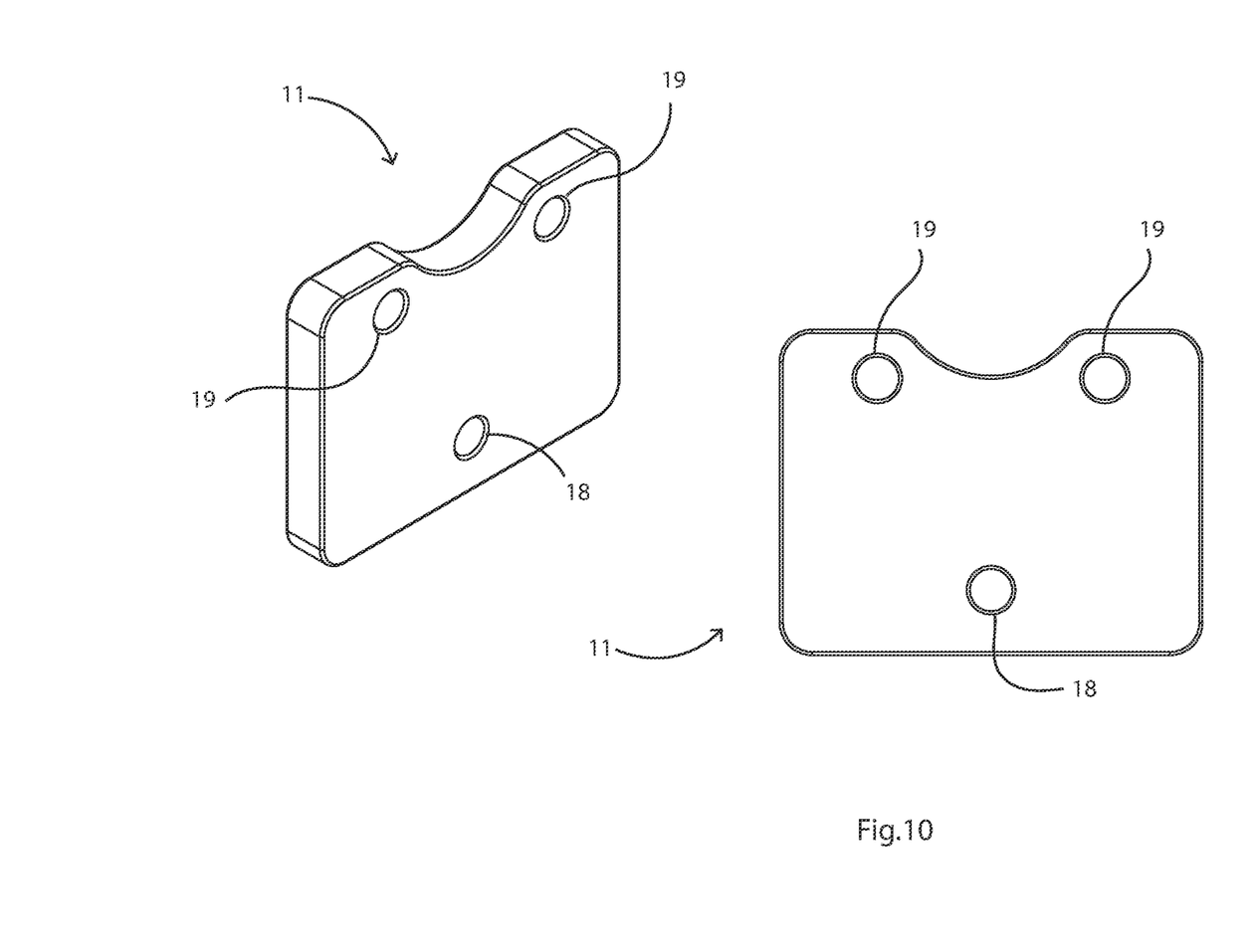
FIG. 10 is a set of perspective, plan, side, and end views of a bearing support movable plate for mounting to the fixed plate of FIG. 9.

The first tube support 5 comprises a first bearing support with a fixed plate 10 which is mounted to the base plate 2 and to which is attached a vertically movable plate 11. The movable plate 11 supports a pair of laterally spaced-apart roller bearings 12 and 13, each having an axis of rotation parallel to a longitudinal axis of the guide 1. The movable plate 11, and hence the bearings 12 and 13, can be adjusted in height relative to the base plate 2 by a wing nut and bolt fastener 15 in a vertical slot 16 of the fixed plate 10. In other examples a tool-operated fastener may be used. As shown in FIG. 10 the movable plate 11 has an aperture 18 for use in fastening to the fixed plate 10, and a pair of apertures which are laterally spaced apart for supporting the bearings 12 and 13.

The second tube support 6 comprises a second bearing support with a C-shaped element 20 which is fixed to the base plate 2 at its opposite longitudinal end. The element 20 has an arm 25 secured to the plate, an arm 26 extending away from the plate and an arm 27 extending laterally inwardly to overlie the plate 2 over the guide's longitudinal axis. This provides a side opening for the device under test. The element 20 supports by a pair of apertures 28 and 29 a pair of roller bearings 22 and 23 the axes of which are laterally spaced apart and are parallel to the guide's longitudinal axis.

In this case both pairs of bearings 12/13 and 22/23 are offset longitudinally and overlap laterally across the longitudinal axis. Each pair forms a cradle on which a tube of a device being monitored rests.

Also, longitudinal position of the first support 5 can be set by the user by changing the pair of opposed holes 30 into which the support 5 is mounted, by way of dowel pins or screws.

Figure 11:
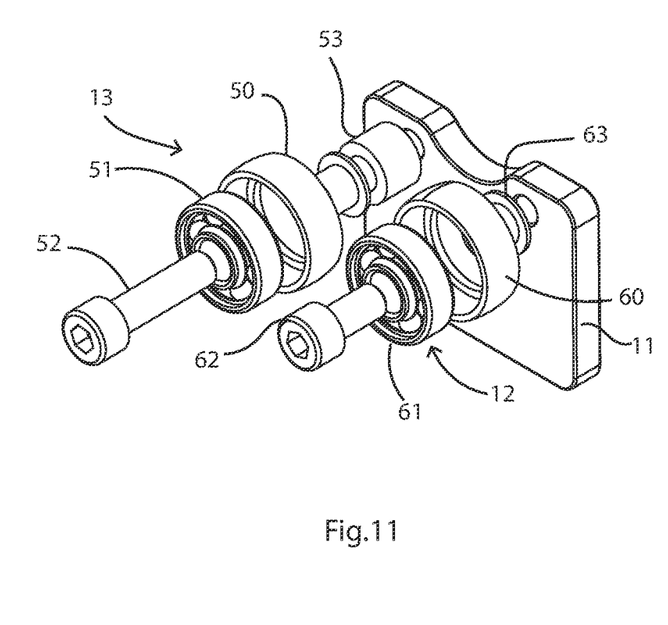
FIGS. 11, 12, and 13 are exploded perspective, plan, and side views of the bearings of one tube support.
Figure 12:
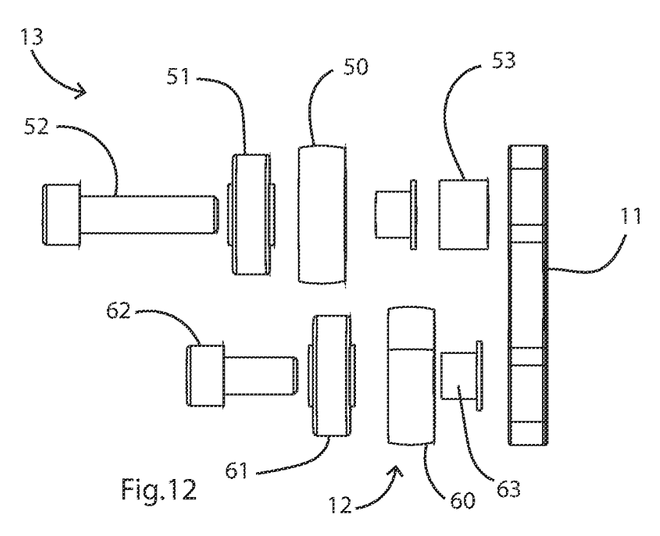
Figure 13:
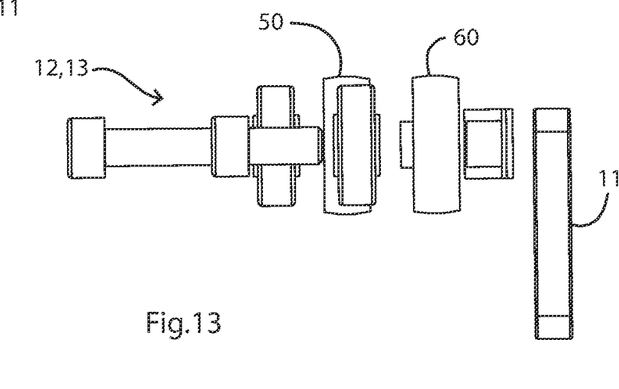

As shown in FIGS. 11, 12, and 13 the bearings 12 and 13 comprise:
bearing 13: rim 50, roller 51, shaft 52, and spacer 53,
bearing 12: rim 60, roller 61, shaft 62, spacer 63.

The material of the test apparatus 1 is of steel, but any of the parts may be of any other material having a suitable hardness, such as a suitable polymer. The bearings are roller bearings, but in other examples the bearings may be of any suitable type which allow a tube to rotate with low friction when rested across the tube supports 5 and 6, such as plain bearings or magnetic bearings. For example, plain bearings may be used which are a small-diameter bearing of brass or bronze, to which is mounted a disc. The outer surface of the disc is the device-engaging surface.

Figure 1:
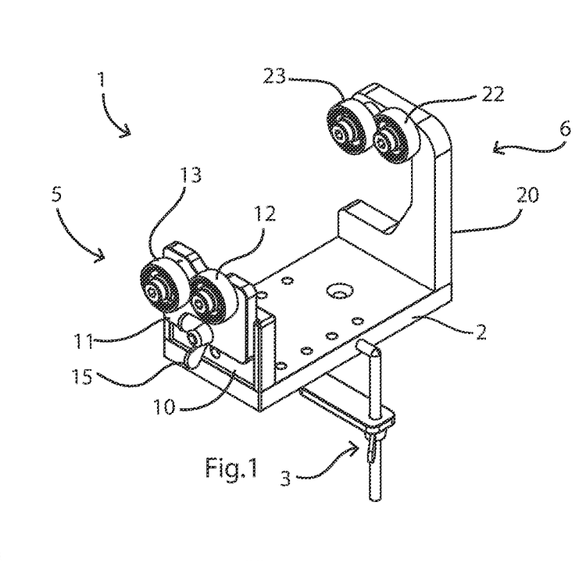
FIG. 1 is a perspective view from above of an apparatus to determine the state of torsional balance of an elongate device about its longitudinal axis.
Figure 2:
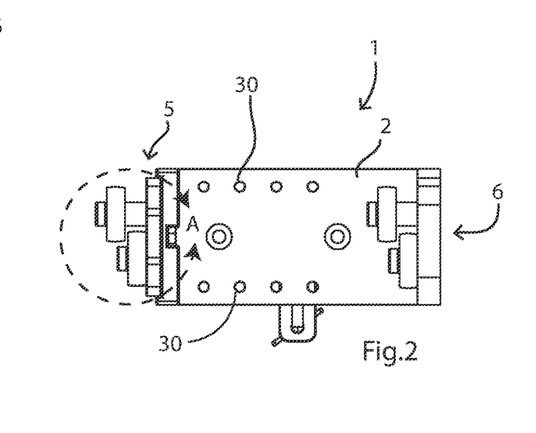
FIG. 2 is a plan view.
Figure 3:
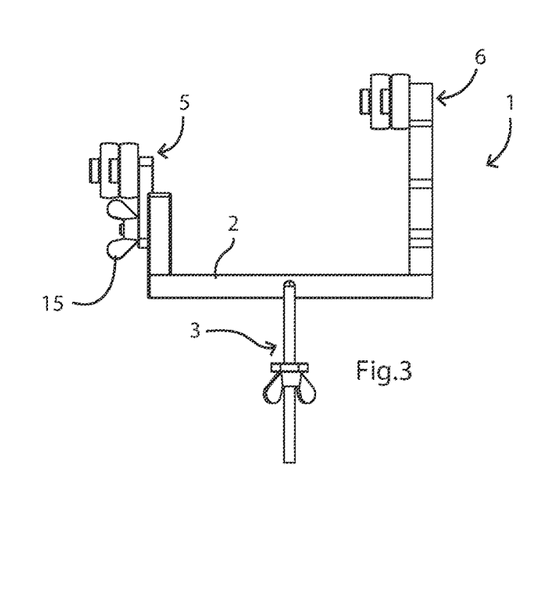
FIG. 3 is a side view.
Figure 4:
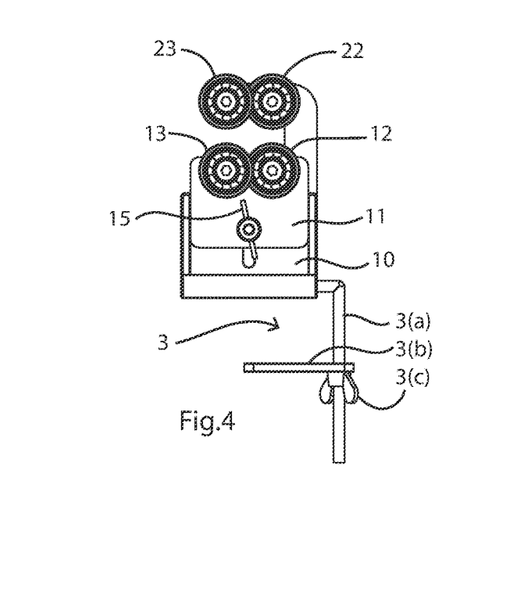
FIG. 4 is an end view.
Figure 5:
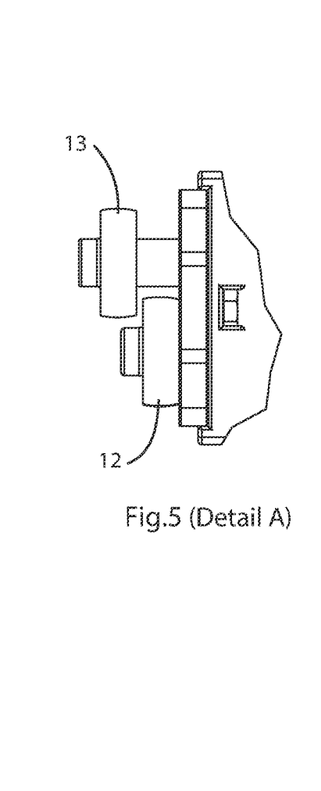
FIG. 5 is an enlarged plan view showing bearings in more detail.
Figure 6:
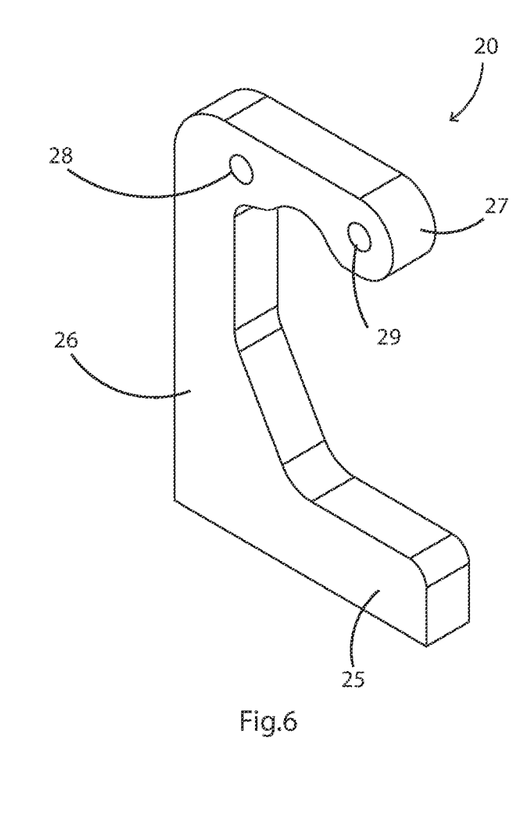
FIGS. 6, 7, and 8 are perspective, front, and plan views of a bearing support element.
Figure 7:
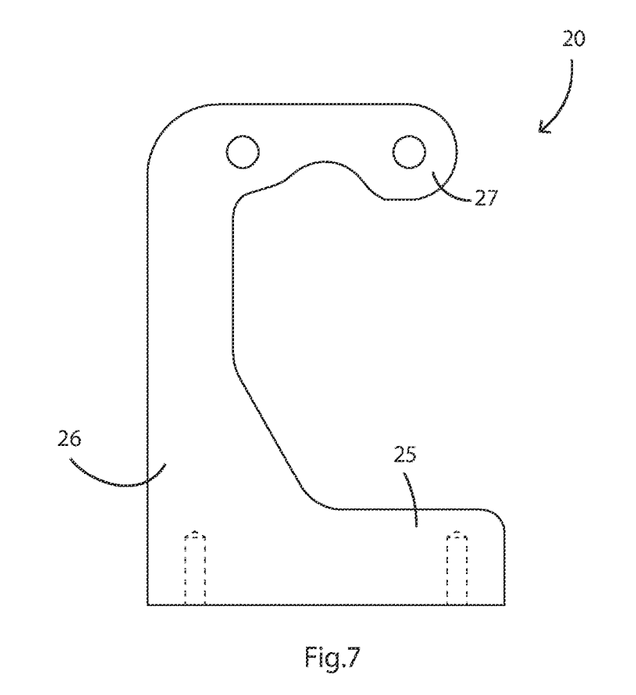
Figure 8:
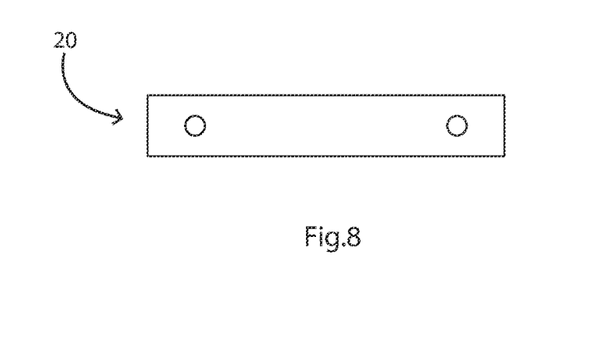
Figure 9:
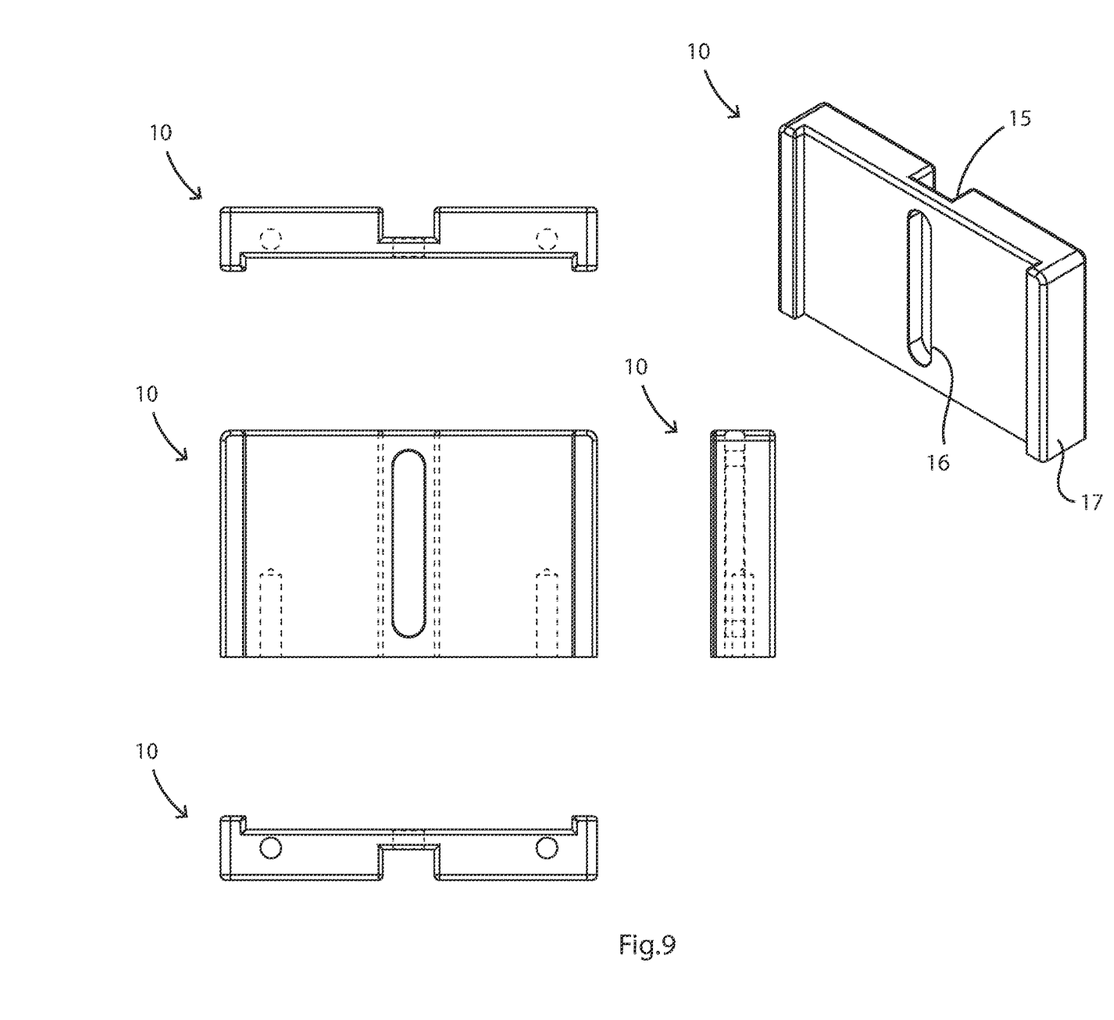
FIG. 9 is a set of perspective, plan, and side views of a bearing support element fixed plate.

As shown most clearly in FIGS. 1 and 4 the second bearings 22 and 23 are at a higher level in use (further from the base plate) than the first bearings 12 and 13. This relative positioning is particularly clearly visible in the end view of FIG. 4.

In general, it is preferred that the distance parameters of the apparatus be in the ranges of:
Longitudinal distance between the first and second bearing sets: 70 mm and 200 mm
Diameter of the bearings: 10 mm and 70 mm.

In use, a tube is placed to overlie the support 5 and to underlie the support 6, being balanced longitudinally so that it is stable. The longitudinal position of the tube is chosen so that it is stably supported by the bearings, the weight of the tube beyond the first support 5 causing the tube to press against the bearings 22/23 in the opposite sense to the manner in which it rests on the bearings 12/13.

Once in this stable position, there is little friction resistance to rotation of the tube about its axis. Hence, any imbalance about the tube's longitudinal axis will result in rotation of the tube so that the radially heaviest side is facing downwardly.

Figure 14:
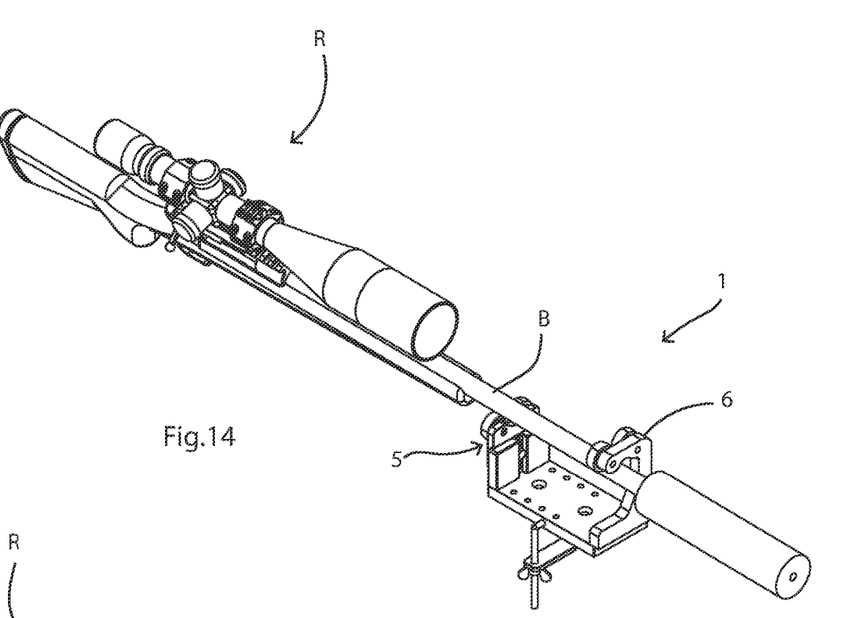
FIGS. 14 and 15 are perspective views showing the guide in use with a rifle, the barrel of the rifle being in contact with the guide.
Figure 15:
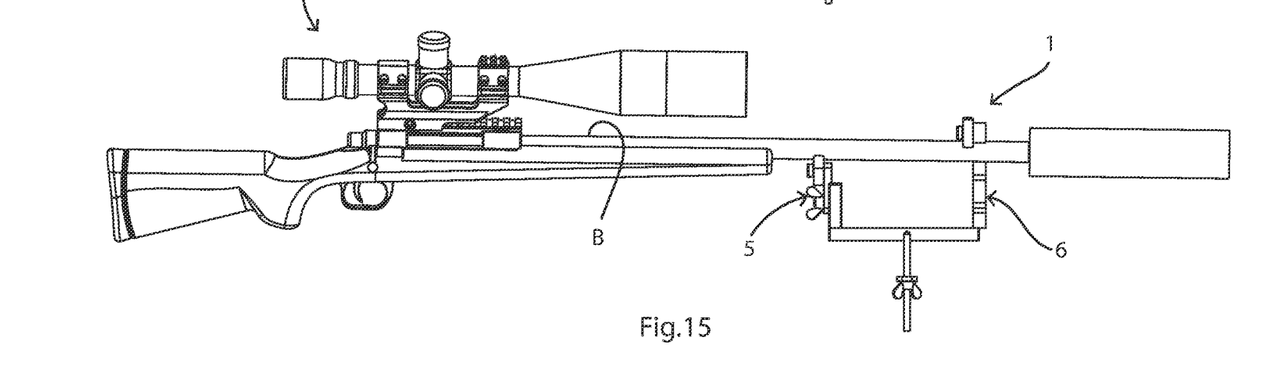

FIGS. 14 and 15 show the example of a rifle R with a barrel B which is supported on and between the first and second tube supports 5 and 6. Various items of equipment including the stock and optics are attached to the barrel B or receiver and in many cases, they are provided separately and assembled by the end user, for example for target shooting or hunting. By mounting the barrel onto the supports 5 and 6 it will be quickly apparent if there is an imbalance and the barrel B will rotate until the heavier radial part faces downwardly. The user can then make the necessary adjustments with repeated use of the guide until sufficient balance is achieved. This will allow the rifle to have an improved performance in use.

Figures 16, 17, 18:
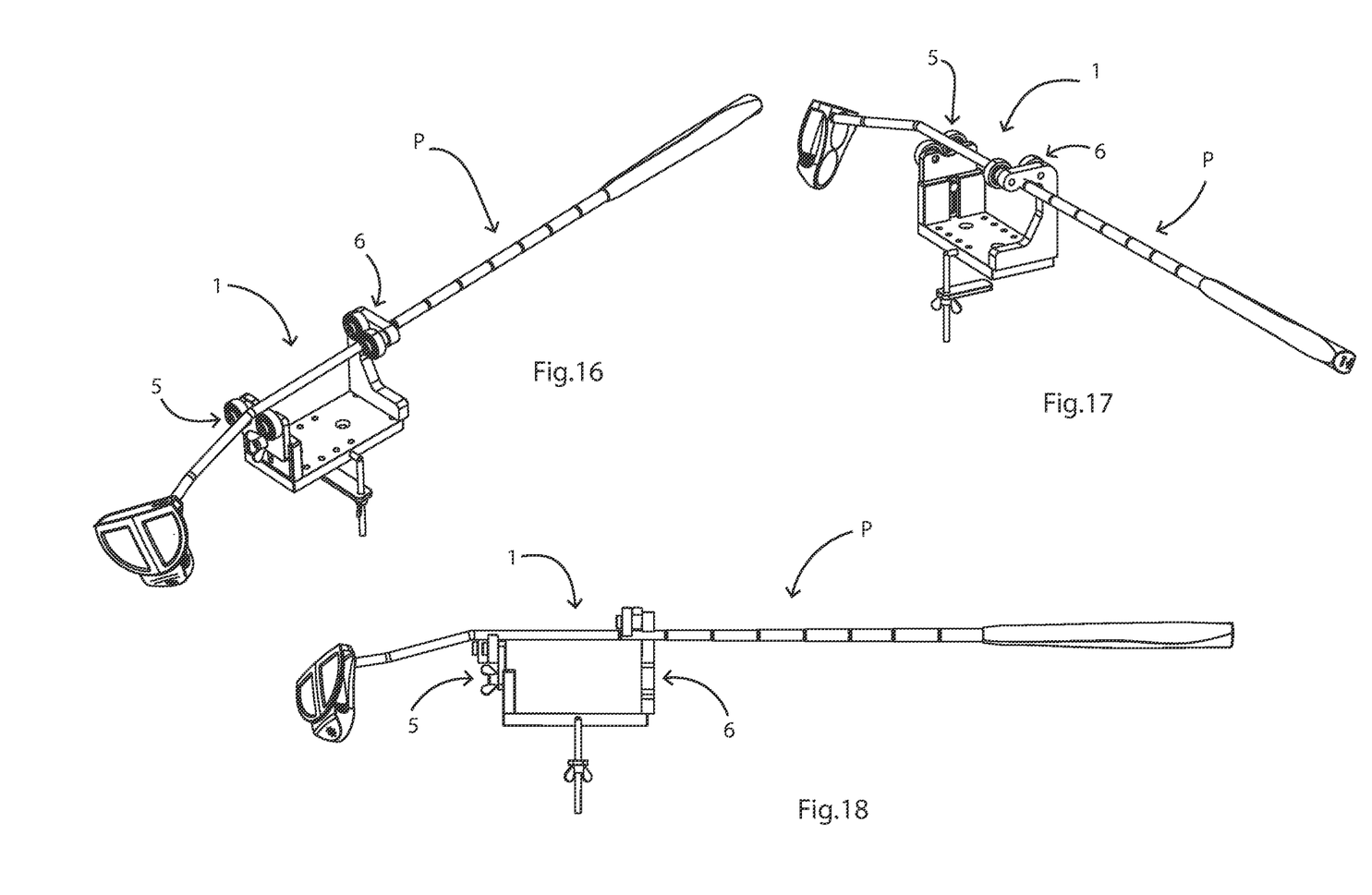
FIGS. 16, 17, and 18 are two perspective views and a side view showing the guide in use with a golf putter, the shaft of which is in contact with the guide.
Figures 19, 20, 21, 22:
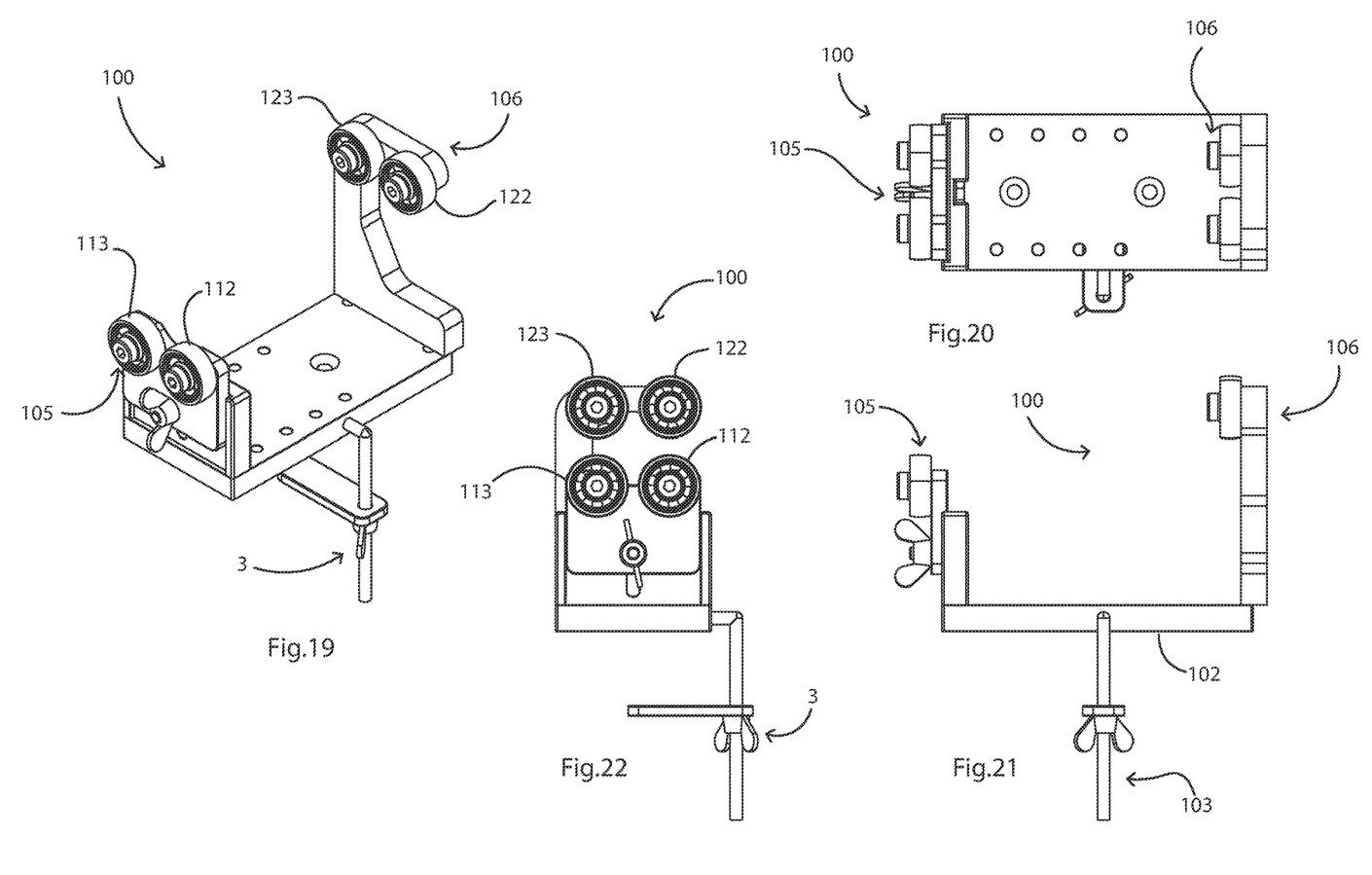
FIGS. 19 to 22 are respectively perspective, plan, side, and end views of an alternative guide, in this case with bearings which do not overlap cross the longitudinal axis.

The test apparatus 1 can be used in a variety of other applications. For example, many golf putters have a head which is symmetrical in weight terms about the shaft axis. The user can check that this is indeed the case by mounting the shaft into the guide 1 and detecting any rotation. It would then be possible to apply minor adjustments to the putter head in order to achieve balance. FIGS. 16 to 18 shows an example with a shaft of a putter P resting on the supports 5 and 6.

It will be noted that if one regards the first bearing set 12/13 as being proximal of the second bearing set 22/23, the device under test is mounted to the apparatus with its centre of gravity proximal of the first bearing set. As shown in FIGS. 14 and 15, the main weight of the rifle is proximally, to the left as viewed in these drawings. Likewise, as shown in FIGS. 16 to 18, the head of the putter causes its centre of gravity to be proximal (to the left) of the first bearing set.

Even if not in balance the angle at which the putter face comes to rest in the balance will indicate how the putter will handle in use. The user can change that angle by adding or removing weights or in a shop choose a putter that might have a desired angle. This use of the test apparatus may apply to any other use, because in some circumstances it is not desired to have the tube perfectly symmetrical, but the guide indicates the heaviest side.

In other applications the device under test is a drive shaft or an archery arrow, for example.

The invention is not limited to the embodiments described but may be varied in construction and detail. For example, if the bearings were deep enough in the longitudinal direction it is possible that the first and second bearing sets could be positioned one directly above the other. However, this is likely to be less convenient and versatile than the arrangement illustrated where they are spaced apart in the longitudinal direction, and this latter arrangement is much preferable. As shown in FIGS. 19 to 22, in another test apparatus, 100, there are tube supports 105 and 106 having roller bearing pairs 112/113 and 122/123 respectively. Other components are similar to the guide 1. In this case the bearings of each tube support are aligned in the lateral direction, being spaced apart sufficiently so that there is no overlap across the longitudinal axis, as is visible in end view. This arrangement is more suitable for use with larger-diameter tubes.

In other examples the bearings are coated with a polymer, material such as nylon to protect the devices being measured. The bearings may have a convex surface as viewed in side view, helping to centralise the shaft onto the bearing (axial pressure). Such a convex surface is visible in FIG. 5, and the extent of the curvature may be more pronounced in other example, with a smaller radius of curvature.

It will be appreciated that the apparatus of any embodiment does not only determine that an elongate device such as a rifle or golf club is out of balance or out of equilibrium, but also illustrates the state of balance of the device being tested. For testing, the device under test needs to have at least two longitudinally spaced-apart portions which are circular in cross-section. The apparatus will show the face angle of the golf club and it will highlight that the golf club will come to rest at a certain face angle thus being either "toe" heavy or "heal" heavy—a concept currently known in the golf industry but previously crudely measured by putting a golf club on a table with the head of the club hanging over the edge of table to determine face angle.

Also, it will be appreciated that it is particularly advantageous to provide one or more an open support arm. Both bearing sets are located on open arms, being conveniently open for access. This is beneficial because rifle barrels and golf clubs have different tube diameters and often have thicker ends on them. For example, a rifle barrel may have a silencer/suppressor attached on the end. A golf club may have a grip on the end. Ease of use is particularly advantageous because devices with irregular shaped portions can be mounted to the test apparatus without adjustment of the device itself. Furthermore, this apparatus allows the tested device to protrude through the bearing set, hence not limiting the tube length or diameter, as illustrated for example in FIGS. 14 to 18

The apparatus is simple and convenient also because it only measures torsional imbalance and not longitudinal imbalance of the device being measured.

It is preferable that the COG of the device being measured outside of the lower bearing set, to ensure adequate upward pressure on the upper bearing set and downward pressure on the lower bearing set.

Another major advantage is that the apparatus works with elongate devices having different diameters at different positions along its length, such as tapered or stepped diameters. This is because the user can adjust the height of one bearing set.

It is also very advantageous that the distance between the bearing sets can be adjusted and set to what is required. Also, the measuring apparatus does not have a stop limit at the end with the higher set of bearings, meaning that the end of the device being measured can be rested in such a way that the end of it is beyond the higher bearing set.

The apparatus is suited to check if there is rotation of the device, and if there is rotation, determine the tube radial side which is facing downwardly. The angle or position at which the tested device will come to its natural rest in ratio to the vertical line will determine or influence the behaviour of the device in its use.

In one example use the apparatus of any embodiment may be used as a mechanical diagnostic tool to find the bore-line balance point of a rifle. The perfect bore-line balance point is achieved by an even distribution of weight above, below, and laterally of the bore of the rifle. Factors that affect the bore-line balance include any component or accessory to the rifle. Both the weight and position of the component or accessory will contribute to the bore-line balance. Weight is not absolute as the distance of that weight from the bore-line will have a leverage influence on the balance point. Examples of such components or accessories include but are not limited to; scope, mounts, magazine, bottom metal, stock, rails etc. Bore-line balance has a direct influence on a number of factors including: barrel harmonics, concentric recoil torque, consistent launch angle, tolerance to alternate firing positions and rests, and it is also the foundation of recoil behaviour. All of these factors are important to ensure the optimisation of repeatability, precision and observation of strike. Diagnosing bore line balance will help guide the end user in choosing the optimum weight and position of all rifle accessories and in the optimum customisation of a rifle. This will be of particular benefit for competition rifles that have to comply with a weight limit or hunting/tactical rifles that are designed as lightweight. The testing apparatus may be used as a tool to assist firearms design, manufacture and customisation by ensuring that the foundation principle of bore line balance is achieved or maximised.

The apparatus may be used as a lightweight, adjustable tool primarily because it clamps the tested device utilising the cantilever principle, the mounting plates being adjustable on the x and y axes, and the wheels mounted to the supports via roller bearings. It is advantageous that the interface between the tested device and the tool is via the four wheels on roller bearings—one pair of wheels fore and above and one pair aft and below. It is these wheels that allow the tested device to rotate without influence of the apparatus and demonstrate a true reading of the bore-line balance. The apparatus facilitates side access for the barrel via the C-shaped bracket that holds the upper pair of roller-bearing wheels—thus allowing for example rifle barrels with moderators or brakes to be mounted into the tool without adjustment of the tool itself. Adjustment of the tool is possible to compensate for the diameter and profile of the device, the length of the tubular part of the device, the weight and weight distribution of the device.

The invention claimed is:

1. An apparatus to determine state of torsional balance of a tested device about its longitudinal axis, the apparatus comprising:
    a base,
    a first bearing set having at least two bearings, in which the first bearing set comprises at least two roller bearings forming a cradle for the tested device,
    a first support mounting the first bearing set to the base,
    a second bearing set having at least two bearings, in which the second bearing set comprises at least two roller bearings forming a cradle for the tested device,
    a second support mounting the second bearing set to the base,
    wherein:
        the first and second supports support the first and second bearing sets at locations which are spaced apart in a longitudinal direction,
        one or both of the first and second supports is mountable to the base at any of a plurality of positions in the longitudinal direction,
        the second support supports the second bearing set at a higher level relative to the base than the first bearing set, so that the tested device can overlie the first bearing set and underlie the second bearing set while being supported solely by the first and second bearing sets,
        at least one of the supports is adjustable to adjust a level of its bearing set above the base, and
        the second support comprises a side opening on one lateral side to allow side access by the tested device, in which the second support comprises an arm which extends away from the base, and a lateral arm which extends laterally over the base across said longitudinal axis and to which the roller bearings are mounted, said lateral arm forming said side opening.

2. The apparatus as claimed in claim 1, wherein at least one of the bearing sets comprises two roller bearings forming a cradle for a device, and wherein the bearings are spaced-apart longitudinally and overlap laterally.

3. The apparatus as claimed in claim 1, wherein the bearings of at least one bearing set have device-engaging surfaces which are curved in the longitudinal direction in a convex manner.

4. The apparatus as claimed in claim 1, wherein the bearings of at least one bearing set comprise a polymer with a device-engaging surface.

5. The apparatus as claimed in claim 1, wherein the base comprises a plurality of engagement features for engagement with a support.

6. The apparatus as claimed in claim 1, wherein the base comprises a plurality of engagement features for engagement with a support, and wherein said engagement features include apertures and pins.

7. The apparatus as claimed in claim 1, wherein the base comprises a plurality of engagement features for engagement with a support, and wherein the base comprises a plate having a planar top surface.

8. The apparatus as claimed in claim 1, wherein said at least one bearing support which is adjustable to adjust a level of its bearing set above the base comprises an adjustable plate mounted on a fixed plate.

9. The apparatus as claimed in claim 1, wherein said at least one bearing support which is adjustable to adjust a level of its bearing set above the base comprises an adjustable plate mounted on a fixed plate, and wherein said support comprises a fastener extending through a slot on one of the fixed and movable plates.

10. The apparatus as claimed in claim 1, wherein said at least one bearing support which is adjustable to adjust a level of its bearing set above the base comprises an adjustable plate mounted on a fixed plate, and wherein said support comprises a fastener extending through a slot on one of the fixed and movable plates, and wherein said fastener is hand-operated or tool-operated.

11. The apparatus as claimed in claim 1, wherein the second support is fixed to the base and the second bearing set is not adjustable.

12. The apparatus as claimed in claim 1, wherein the base includes a clamp for attachment to a table.

13. The apparatus as claimed in claim 1, wherein longitudinal distance between the first and second bearing sets is in the range of 70 mm and 200 mm.

14. The apparatus as claimed in claim 1, wherein diameter of each bearing is in the range 10 mm and 70 mm.

15. A method of detecting, using the apparatus of claim 1, imbalance about a longitudinal axis of an elongate device under test, said device having a circular cross-sectional shape in at least two longitudinally spaced-apart first and second portions, the method comprising the steps in any order of:
   adjusting a level of at least one of the bearing sets so that a selected device placed on both bearing sets will be horizontal, and extending parallel to the base,
   placing said device first portion on the first bearing set,
   moving the device laterally so that the device second portion enters via the second support side opening and engages the underside of the second roller bearing set and the device is fully supported by the bearings with the device extending longitudinally beyond both said bearing sets, and
   visually checking if there is rotation of said device, and if there is rotation,
   visually determining a radial side which is facing downwardly.

16. The method as claimed in claim 15, wherein the device is a rifle and the first and second portions are on a barrel of the rifle.

17. The method as claimed in claim 15, wherein the device is a golf club and the first and second portions are on the shaft of the golf club.

18. The method as claimed in claim 15, wherein the first bearing set is proximally of the second bearing set, and the device under test is mounted to the apparatus with its centre of gravity proximal of the first bearing set.

* * * * *